United States Patent
Endo et al.

(10) Patent No.: US 6,740,424 B2
(45) Date of Patent: May 25, 2004

(54) SURFACE COATED ALUMINUM FINE POWDER AND AQUEOUS CHROMIUM-FREE CORROSION INHIBITING COATING COMPOSITION INCLUDING THE SAME

(76) Inventors: Yasuhiko Endo, 24-30, Higashi-Hongo 2-chome, Midori-Ku, Yokohama (JP); Tomio Sakai, 1507, Kusunokiajima 3-chome, Kita-Ku, Nagoya (JP); Saburo Shimada, 19-3, Hiroji-Honmachi 5-chome, Showa-Ku, Nagoya (JP)

( * ) Notice: Subject to any disclaimer, the term of this patent is extended or adjusted under 35 U.S.C. 154(b) by 37 days.

(21) Appl. No.: 09/920,078

(22) Filed: Aug. 1, 2001

(65) Prior Publication Data

US 2002/0017164 A1 Feb. 14, 2002

(30) Foreign Application Priority Data

Aug. 2, 2000 (JP) .......................................... 2000-233883

(51) Int. Cl.$^7$ .................................................. B22F 7/04
(52) U.S. Cl. ........................ 428/558; 428/570; 148/247; 148/253; 148/261; 148/265; 106/14.12; 252/387
(58) Field of Search .............................. 148/247, 253, 148/261, 275; 427/216, 217; 428/558, 570; 106/14.12; 252/387

(56) References Cited

U.S. PATENT DOCUMENTS

| 3,248,251 A | | 4/1966 | Allen |
| 5,242,488 A | | 9/1993 | Stetson et al. |
| 5,272,223 A | * | 12/1993 | Iri et al. ..................... 525/452 |
| 5,478,413 A | | 12/1995 | Mosser et al. |
| 5,803,990 A | * | 9/1998 | Mosser et al. .............. 148/261 |

* cited by examiner

Primary Examiner—Andrew L. Oltmans
(74) Attorney, Agent, or Firm—McGlew and Tuttle, P.C.

(57) ABSTRACT

A chromium-free corrosion inhibiting coating composition, which does not utilize harmful chromium compounds and can be used for corrosion inhibition of a metal surface, comprising a slurry mixture in which coated aluminum fine powder treated with a hydrophilic coupling agent is suspended in an acidic phosphate bonding solution and which can be stored in a refrigerator, is disclosed. A titanium-coupling agent is preferable to use as the coupling agent, which treats a surface of the aluminum fine powder. In this aqueous chromium-free corrosion inhibiting coating composition, 25 to 40% by weight of the aluminum fine powder a surface of which is treated with the coupling agent is suspended in the acidic phosphate bonding solution.

7 Claims, No Drawings

SURFACE COATED ALUMINUM FINE POWDER AND AQUEOUS CHROMIUM-FREE CORROSION INHIBITING COATING COMPOSITION INCLUDING THE SAME

BACKGROUND OF THE INVENTION

1. Field of the Invention

The present invention relates to aluminum fine powder suitable for use in an aqueous phosphate-based coating composition which takes advantage of a sacrificial corrosion inhibiting effect of aluminum and to an aqueous chromium-free corrosion inhibiting coating composition which does not contain harmful chromium components and which is formed with the aluminum fine powder suspended in an aqueous phosphate-based bonding solution, in order to inhibit corrosion of a metal surface, especially a surface of iron-based material.

2. Description of the Related Art

There are a variety of conventional corrosion inhibiting coating compositions depending on mechanisms of corrosion inhibition and based on corrosion inhibiting components. As such corrosion inhibiting coating compositions, coating compositions that are excellent in a corrosion inhibiting effect, taking advantage of a sacrificial corrosion inhibiting effect of zinc or aluminum, have been known as in the case of plating. Further, there are different kinds of bonding solutions (binders) for the corrosion inhibiting coating compositions, which are roughly classified into two categories, those with an inorganic aqueous bonding solution and those with an organic bonding solution. Well-known corrosion inhibiting coating compositions using the inorganic aqueous bonding solution include an alkali-silicate type of corrosion inhibiting coating composition such as a zinc-rich paint and a phosphate-based corrosion inhibiting coating composition such as a Sermetel coating composition available from SERMATECH INTERNATIONAL, INC. of the U.S. taking advantage of the sacrificial corrosion inhibiting effect of aluminum which is used for surface treatment of turbine blades of aircraft engines.

Many of these corrosion inhibiting coating compositions usually contain hexavalent chromium components that have a specific corrosion inhibiting effect. For example, a fundamental technology of the Sermetel coating composition from SERMATECH, INC. is disclosed in U.S. Pat. No. 3,248,251 filed in 1963 by Teleflex Incorporated that is a parent company of the SERMATECH. Although the patent describes that molybdate has the same corrosion inhibiting effect as that of chromate, hexavalent chromium (chromate ion) having a significant corrosion inhibiting effect is actually included in the Sermetel coating composition as an essential component.

Hexavalent chromium in the corrosion inhibiting coating composition would lead to formation of a conversion coating on a metal surface or to passivation of the metal surface. That is, the hexavalent chromium component in the Sermetel coating composition forms the conversion coating even on a particle surface of aluminum fine powder which is suspended in the coating composition so as to effectively prevent a reaction generating a hydrogen gas between an acidic phosphate-based bonding solution, the pH of which is around 3, and the aluminum fine powder. Therefore, it becomes possible to achieve a several-months pot life of the corrosion inhibiting coating composition.

Further, the corrosion inhibiting effect of the hexavalent chromium component also effects a metal substrate to be coated as well. The conversion coating or passivation coating including hexavalent chromium is formed on a surface of the metal substrate and prevents a reaction between the acidic phosphate-based bonding solution and substrates (hydrogen is generated when steel products are dipped). This conversion coating has the effect of protecting the substrate material from rust even after the coating has been baked. The Sermetel coating composition has excellent properties resulted from combining the sacrificial corrosion inhibiting effect of aluminum and the corrosion inhibiting function of the hexavalent chromium component and also has a reputation as an excellent corrosion inhibiting coating with a heat resistance up to around 600° C.

However, it has been commonly known that the hexavalent chromium component is carcinogenic, and even if trivalent chromium is used, it is not easy to prevent oxidation of trivalent chromium to hexavalent chromium. Therefore, it is preferable to use a corrosion inhibiting coating composition that is completely free of chromium components with consideration of their influences on the global environment. The first-ever non-chromium corrosion inhibiting coating composition, which is completely free of chromium components, has been developed by Solar Turbines Incorporated of the U.S. and is disclosed in U.S. Pat. No. 5,242,488. Thereafter, U.S. Pat. No. 5,478,413 titled "Environmentally friendly coating compositions" was filed from the SERMATECH INTERNATIONAL INC., which is an manufacturer of the Sermetel coating, and issued.

SUMMARY OF THE INVENTION

A problem in practical utilization of these non-chromium corrosion inhibiting coating compositions is that aluminum fine powder dispersed in the coating composition reacts with an acidic phosphate-based bonding solution to produce hydrogen, so that the coating composition becomes unusable within 1–2 days due to an increase in its viscosity and has a short pot life. The inventors have assumed that the pot life can be increased by forming an overcoat, alternative to a conversion coating formed by hexavalent chromium, on a surface of the aluminum fine powder, and now consequently found a solution as a result of various studies.

An object of the present invention is to provide aluminum fine powder having an overcoat, alternative to a conversion coating formed by harmful hexavalent chromium, on its surface and a phosphate-based aqueous chromium-free corrosion inhibiting coating composition having a practical pot life in which the aluminum fine powder is suspended in a bonding solution.

According to the present invention, the surface of the aluminum fine powder is treated with a hydrophilic coupling agent. A titanium-coupling agent can be used as the hydrophilic coupling agent.

Further, in the present invention, the aluminum fine powder which is surface treated with the hydrophilic coupling agent can be obtained by preparing ethyl alcohol to which 3 to 12% by weight of water is added, dissolving 0.3 to 1.5 parts by weight of the hydrophilic coupling agent relative to 100 parts by weight of the aluminum fine powder to be added in this solution, suspending the aluminum fine powder to be treated in this solution, forming a thin film of the coupling agent on a particle surface of the aluminum fine powder by heating and keeping the solution at 50 to 70° C. for 2 to 7 hours with the aluminum fine powder suspended therein, filtrating the solution which contains hydrolytic products of the coupling agent to recover the aluminum fine powder, rinsing the recovered aluminum fine powder with ethyl alcohol having a purity of 99% by weight or more, and heating the rinsed aluminum fine powder to a temperature which is lower than a boiling point 78.3° C. of ethyl alcohol to dry it under reduced pressure.

An aqueous corrosion inhibiting coating composition according to the present invention is a composition in which 25 to 40% by weight of the aluminum fine powder which is surface treated with the hydrophilic coupling agent is suspended in the acidic phosphate-based aqueous bonding solution. In this case, a titanium-coupling agent can be used as the hydrophilic coupling agent.

In the above-described case, the phosphate-based aqueous bonding solution can contain phosphate ions, aluminum ions, zinc ions, and two or more kinds of alkaline earth metal ions, and further contain 0.2 to 1% by weight of polyphosphate ions.

A surface of the aluminum fine powder used in the present invention is treated with the coupling agent and a surface of the particle is covered with a thin overcoat of the coupling agent. Although there are many kinds of coupling agents, it has been found that the only limited kinds of coupling agents can be effective for this purpose. An effective coupling agent is within a class in which the treated surface exhibits hydrophilic property, so that making the particle surface of the aluminum fine powder hydrophilic and facilitates its dispersion into the aqueous phosphate bonding solution. When other coupling agents are used, the treated surface exhibits hydrophobic property, so that it is essential to take advantage of an aid of a dispersion agent or surfactant in order to suspend the aluminum fine powder into the aqueous bonding solution. Therefore, it is difficult to sufficiently disperse the hydrophobic powder into the aqueous bonding solution.

Treatment of the aluminum fine powder with the coupling agent results in formation of an overcoat of the coupling agent on a surface of the aluminum fine powder, and reduces surface activity of the aluminum fine powder for a reaction. Specifically, a reaction in which hydrogen generates when the aluminum fine powder is dispersed into the acidic phosphate chromium-free bonding solution can be prevented, and the pot life of the corrosion inhibiting coating composition being stored in a refrigerator can be increased from several days to nearly one months, and safety of storing the aluminum fine powder which is flammable can be improved.

Considering influence on the global environment, the corrosion inhibiting coating composition is preferable to be free of chromium components, to be an aqueous composition, and to barely release volatile organic components (VOCs) such as organic solvents.

There are two types of commercially available aluminum fine powder, that is, an air-atomized powder being atomized by compressed air and a gas-atomized powder being atomized by non-oxidative compressed gas. In the former, a surface of the powder particle is covered with a relatively thick oxide film and constituted by oval particles being deformed by influence of the oxide film, and in the latter, a surface of the powder particle is covered with a thin oxide film and constituted by sphere particles. Since a particle size distribution of the atomized aluminum powder is usually considerably wide, classified powders depending on their uses are commercially available, and for example, there is aluminum fine powder having a mean particle diameter of as small as about 1 $\mu$m. Also, aluminum fine powder constituted by scale-like particles made by processing the atomized powders is commercially available, and the typical scale-like particle has a width of the order of 10 $\mu$m and has a thickness of the order of 0.1 $\mu$m.

An aluminum dihydrogen phosphate solution is preferable to be used as a main raw material of the phosphate-based aqueous bonding solution for an aqueous corrosion inhibiting coating composition according to the present invention. The aluminum dihydrogen phosphate solution having a concentration of about 20% by weight is used as a binder for refractories or the like and is commercially available, so that it is preferable to use the solution in order to save time and effort to dissolve powder of the phosphate into water.

When a dispersion agent is added to the binder solution during preparation of the aqueous corrosion inhibiting coating composition of the present invention, the aluminum fine powders are well dispersed into the bonding solution and enables to form a homogeneous coated film, but generate foams which cause defects in the coated film hardly disappears. Therefore, it is preferable to decrease the foam by the combined use of an antifoaming agent and the dispersion agent.

Hydroxyethyl cellulose or hydroxypropyl cellulose is used for increasing the viscosity of an aqueous coating composition, and the coating composition can be viscous by adding the above-described cellulose compound in the form of a 4% by weight of aqueous solution. This kind of cellulose compound can be preferably used by previously preparing its aqueous solution having a concentration about 4% by weight and by mixing the solution with the bonding solution.

Glycerin has an effect of increasing the viscosity, and a function of regulating a drying rate of the coating composition (decreasing the drying rate). Previously making a mixed solution of glycerin with a dispersion agent or antifoaming agent which does not easily dissolve in water facilitates mixing these with an aqueous bonding solution.

The corrosion inhibiting coating composition is usually used as an undercoat, and it is common to apply a top coat on the corrosion inhibiting coated film in order to further improve the corrosion inhibiting performance of the coated film.

As a corrosion inhibiting coating composition for screws or fasteners, there is a usage for precision screws, which requires a thin film of around 8 $\mu$m in thickness. To form such a thin-coated film, it is preferable to use aluminum fine powder having a mean particle diameter of around 1 $\mu$m or scale-like aluminum fine powder.

A sacrificial corrosion inhibiting effect is such an effect when both an easily ionizable metal belonging to the former part (less noble) of the ionization series is in electrical connection with a hardly ionizable metal belonging to the latter part (noble) of the ionizarion series are present in an electrolyte solution such as salt water, the easily ionizable metal is preferentially ionized (oxidized), so that the other metal is protected from oxidation.

Burnishing treatment performed on the corrosion inhibiting coated film including aluminum fine powder as filler is a treatment for providing electrical connection (electrical conductivity) between particles of the aluminum fine powder in the coated film and between the aluminum fine powder particles in the coated film and a steel substrate. That is, this treatment is a kind of blast treatment in which abrasive grain particles of 320 meshes are moderately blasted onto a surface of the coated film. This burnishing treatment ensures to keep the sacrificial corrosion inhibiting effect of the coated film.

A purpose of adding water into an ethyl alcohol solvent which dissolves a coupling agent is to hydrolyze the coupling agent and deposit the coupling agent on a surface to be treated so as to form a thin film of the coupling agent. A typical amount of water to be added to the ethyl alcohol, which is used for the coupling treatment, is usually around 10% by weight, but this amount can be changed as appropriate. Treated aluminum fine particles adhering on a surface of a used vessel can be washed off by ethyl alcohol as appropriate and recovered within a batch. Although a coupling treatment conducted for a sufficiently long time can form a coupling film that completely covers the surface of the treated powder particles, this treatment is preferable to be done within 7 hours, which allows the treatment to be completed within one day.

A temperature of coupling treatment is preferable to be 50 to 70° C., which is lower than the boiling point of ethyl alcohol, 78.3° C., so as to minimize evaporation of ethyl alcohol. A rotary evaporator was used for coupling treatment in the examples described hereinafter, but this coupling treatment may also be conducted in a tank fitted with a stirrer, which temperature is thermally controllable. The aluminum fine powder treated with the coupling agent may be rinsed by ethyl alcohol of 99% by weight or more to remove an excess part of colloidal substances produced by hydrolysis of the coupling agent.

The aluminum fine powder, which has been rinsed by ethyl alcohol after the coupling treatment, can be quickly dried. The wet cake of aluminum fine powder is heated in a dryer, then ethyl alcohol is evaporated in an evacuated vessel fitted with a water jet pump, and the powder can be dried without discharging vapors from ethyl alcohol in a room.

Since mixing of organic solvents such as acetone or ethyl alcohol with the phosphate-based bonding solution may cause degeneration of the bonding solution and may change its viscosity (for example, increases viscosity), the aluminum fine powder wetted with ethyl alcohol used in the coupling treatment is preferable to be dried sufficiently. Sufficient drying of the powder in a dryer kept at around 70° C. for more than several hours can increase adhesion of the coupling film to the surface of the fine powder particle. After drying, the aluminum fine powder can be recovered as a cake that can easily be made into a powder.

An amount of aluminum fine powder to be suspended in the phosphate-based aqueous solution is determined with consideration of a concentration of the aqueous phosphate-based bonding solution to be used (with consideration of a volume ratio of a dried bonding solution and aluminum fine powder in the corrosion inhibiting coating film), and is preferably 25 to 40% by weight of the corrosion inhibiting coating composition.

The phosphate-based bonding solution becomes a water-insoluble solid (vitreous) after baking at 300° C. or more. When double-coating is performed, a temperature for baking the first coated film should preferably be around 250° C., but a temperature for baking the second coated film must be a given temperature to obtain a water-insoluble coated film. A high baking temperature can reduce the time required for the baking treatment. However, when the baking temperature rises to a temperature (around 600° C.) at which the aluminum fine powder may be oxidized, a thermit reaction may occur in which the adjacent oxide substances are reduced and the aluminum fine powder is oxidized.

The aqueous phosphate-based bonding solution contains a lot of phosphate ions and aluminum ions due to the use of an aluminum dihydrogen phosphate solution as a main raw material. In order to improve the corrosion inhibiting performance and to reduce reaction activities between the bonding solution and the aluminum fine powder, various kinds of metal ions are introduced to the bonding solution. For example, it is assumed that the presence of zinc ions leads to formation of a conversion coating and the corrosion inhibiting performance of the coating composition will improve. On the other hand, it is assumed that the presence of alkaline earth metal ions such as magnesium ions weakens the acidity of the bonding solution to suppress the reaction of bonding solution with the aluminum fine powder.

In the case of the bonding solution as described in the examples below, the aluminum fine powder was added to the starting solution and heated in advance to allow the reaction which generates hydrogen to proceed as much as possible, and the concentration of aluminum ions in the bonding solution is increased to a level of saturation, in order to minimize the reactivity of the bonding solution with the aluminum fine powder.

In this reaction, metal ions such as magnesium ions, which have once dissolved in the solution, is precipitated out. Properties and amounts of the precipitate vary depending on the kind and amount of alkaline earth metal ions included in the solution, and when a lot of magnesium ions are included in the solution, a large amounts of viscous precipitate will appear. Introduction of calcium ions or strontium ions can decrease the amount of the precipitate. However, these metal ions can not dissolve in large amounts because of the limitations of their solubility and the time required for their dissolution. Therefore, these metal ions are preferably added to the bonding solution in the form of carbonates or hydroxycarbonates, which are easy to be dissolved.

Addition of a small amount of sodium hexametaphosphate (a kind of polyphosphates), which is assumed to have an effect as an inhibitor for suppressing oxidation of the metal, to the bonding solution (0.2 to 1% by weight) can decrease the amount of the precipitate and increase the viscosity of the bonding solution. Further, production of the precipitate, which may easily occur in the stored bonding solution, can be avoided.

Various well-known inhibitors are additives for suppressing oxidation reaction of the metal, and an introduction of some inhibitors possibly improve the corrosion inhibiting characteristics of the corrosion inhibiting coating composition. However, attention should be paid when using other inhibitors which are not compatible with the aqueous phosphate-based bonding solution, because the inhibitors may not dissolve in the solution or the amount of precipitate may be increased.

DETAILED DESCRIPTION OF THE PREFERRED EMBODIMENTS

EXAMPLES 1 AND 2

Preparation of Aluminum Fine Powder Treated with a Coupling Agent

Five hundred grams of aluminum fine powder VA-2000 (air-atomized powder having a mean particle diameter of about 5 $\mu$m) manufactured by Yamaishi Metals was weighed. The weighed aluminum fine powder was introduced into about 400 g of ethyl alcohol (using synthetic modified alcohol with a purity of 99.5%) containing 5% by weight of water in a 1-litter beaker, dispersed with a homogenizer (PT1200 manufactured by Polytron of Switzerland) for 6 minutes, and suspended in the ethyl alcohol containing water. Five grams of a titanium-coupling agent KR-44 manufactured by Ajinomoto Co. Inc. was added to this suspension and further dispersed with the homogenizer for 4 minutes, and then this suspension was transferred into an eggplant type flask (the volume of which was 1 liter) of a rotary evaporator. This eggplant type flask was immersed in a hot water bath kept at 60° C. and was held in a stirring condition with 45 RPM for 7 hours to complete this coupling treatment.

A fine-mesh filter paper (5C for chemical analysis) was then set on a Buchner funnel fitted to a 5-liter suction bottle, and the suspension of the aluminum fine powder was transferred onto the filter paper to perform suction filtration by a water jet aspirator. After the liquid component of this suspension was mostly sucked into the bottle, about 200 ml of ethyl alcohol with a purity of 99.5% was poured into the Buchner funnel to rinse the filtered powder by the alcohol. A cake of aluminum fine powder from which liquid components are removed as much as possible on the filter paper was transferred into a 1-liter heat-resisting glass vessel, then this whole glass vessel was placed in a dryer kept at 70° C. After the cake was warmed, this whole glass vessel was transferred into another vessel which can be evacuated, and dried under reduced pressure using the water jet aspirator.

Heating and drying under reduced pressure were repeated several times, and at the final drying operation, this vessel was held in the dryer at 70° C. overnight to obtain a completely dried aluminum fine powder. The aluminum fine powder was in the form of a cake at this time, but the cake was so frail that a rubber spatula could easily grind it. The dried cake-like aluminum fine powder was transferred onto a 32-mesh sieve and ground by the rubber spatula so as to be transferred into a 1-liter glass vessel for storing which was placed downward. The aluminum fine powder surface-treated with this KR-44 coupling agent was wettable with water and hydrophilic.

In this example, a rotary evaporator was used for the coupling treatment of about 500 g of aluminum fine powder, but the coupling treatment can be performed by introducing the aluminum fine powder and treatment solutions into a large vessel, which can be heated and stirred continuously.

Preparation of an Aqueous Bonding Solution

Three hundred grams of an aqueous aluminum dihydrogen phosphate solution (an aqueous aluminum dihydrogen phosphate solution with a concentration of 20% by weight, manufactured by Taki Chemicals) was weighed into a 1-liter beaker made of heat-resisting glass, 400 g of ion exchanged water was added into this vessel to dilute the solution, then 10 g of tetrahydrated zinc phosphate (a first class grade reagent), 2 g of strontium carbonate (a first class grade reagent), and 10 g of magnesium hydroxycarbonate (a first class grade reagent) were successively added to this diluted aqueous aluminum dihydrogen phosphate solution and stirred to completely dissolve them. 5 g of aluminum fine powder (VA-2000) was added to this aqueous phosphate solution, and then this beaker was placed on an electric hot plate and heated. As the temperature of the solution approached near the boiling point, the aluminum fine powder rigorously reacted with the acidic aqueous phosphate solution and hydrogen was generated.

This reaction was allowed to continue for a while by repeatedly heating this solution as required, then this solution was left cooled to obtain a solution containing a grayish precipitate, the volume of which was decreased to about 60% of its original volume. A specific gravity of the filtrate (to be used for a bonding solution) obtained by filtration of the above solution was measured to be 1.24 by the Alchimedes method.

163 g of the above-described filtrate was weighed into a 500-ml plastic beaker. Then 1.45 g of a mixture in which 1.0 g of glycerin (a first class grade reagent), 0.3 g of a dispersion agent (Lactimon-ws commercially available from BIK Chemie Japan), and 0.15 g of an antifoaming agent (BYK-019 commercially available from BIK Chemie Japan) were previously mixed and 2.0 g of 4% by weight aqueous solution of hydroxyethyl cellulose (the first grade reagent) were added into the above described weighed filtrate and mixed sufficiently to obtain an aqueous bonding solution.

Preparation of a Corrosion Inhibiting Coating Composition

A bottom part of the 500-ml plastic beaker containing the above described aqueous bonding solution was cooled by immersing it in iced water, and then 70 g of the surface treated aluminum fine powder was gradually introduced into the solution with stirring by the homogenizer. Then an aqueous chromium-free corrosion inhibiting coating composition containing 30% by weight of aluminum fine powder suspended therein was obtained. The prepared aqueous corrosion inhibiting coating composition was stored in a refrigerator (kept at about 4° C., this condition was used hereinafter) to avoid deterioration.

Coating with the Corrosion Inhibiting Coating Composition

Twenty wood screws (about 45 mm in length) commercially available were degreased by acetone, dipped in a diluted hydrochloric acid, and then rinsed with water to remove zinc or the like which was plated on a surface of the wood screw. These wood screws were blast treated with 320-mesh abrasive grain. Then the corrosion inhibiting coating composition, which had been prepared in the morning and stored in the refrigerator, was taken out from the refrigerator and called as Example 1. And the corrosion inhibiting coating composition, which had been prepared as in the case of Example 1 and stored in the refrigerator for a week, was taken out from the refrigerator and called as Example 2. Each of the coating compositions was dispersed by the homogenizer for 3 minutes and ground by a rubber spatula in order to permit the compositions to pass through a 500-mesh sieve net (made of 18Cr-8Ni stainless steel).

Each of the corrosion inhibiting coating compositions from Example 1 and Example 2 was coated on ten wood screws according to a dip and spin method (The wood screw was dipped in the corrosion inhibiting coating composition, and then the wood screw was placed in a stainless steel basket which was set on a centrifuge and rotated at 400 RPM for a few seconds to remove excessive coating composition deposited on the screw. This centrifuge was H-26T manufactured by Kokusan). The wood screws on which the corrosion inhibiting coating composition was coated were placed in a hot air dryer and heated to 340° C., and kept at this temperature for 20 minutes to bake the coated composition.

Each of the same corrosion inhibiting coating compositions was coated again on five wood screws out of these ten wood screws according to the dip and spin method, and baked under the same conditions as described above. Then these 20 wood screws in total, on which the corrosion inhibiting coating composition was coated once or twice, were moderately blasted or burnished with 320-mesh abrasive grains under air-pressure of 1 atm. to give the electrical conductivity to coated films.

Salt Water Dipping Test

About 50 ml of salt water (5% by weight) was introduced into 100-ml plastic vessels, respectively, and three wood screws (for 4 kinds of screws coated once and twice in Example 1 and Example 2) were dipped in the salt water. The plastic vessel containing the salt water and the wood screws was placed in a dryer kept at 35° C. and the corrosion inhibiting characteristics of the corrosion inhibiting coating composition was evaluated. As for the wood screws dipped in the salt water, both of the once-coated screws and the twice-coated screws in Example 1 and in Example 2 did not exhibit formation of red ferric rust even when two months had elapsed.

EXAMPLE 3

A corrosion inhibiting coating composition with the same specification as that of Example 1, which was stored for 21 days (3 weeks) in a refrigerator after preparation, was taken out from the refrigerator and coated on the wood screws in the same manner as in Example 1. Their corrosion inhibiting characteristics were evaluated by the salt water dipping test as well, and the same corrosion inhibiting performance as in the case of Example 1 could be recognized. This apparently explains that the corrosion inhibiting coating composition after stored in the refrigerator for about three weeks maintained low viscosity and corrosion inhibiting characteristics almost the same as the corrosion inhibiting coating composition from Example 1.

EXAMPLE 4

In Example 1, aluminum fine powder, which was surface-treated with the titanium-coupling agent KR-44, was rinsed with 200 ml of 99.5% ethyl alcohol. However, in this example, the aluminum fine powder was prepared by the coupling treatment as in the case of Example 1 with the exception that rinsing by ethyl alcohol was omitted. Consequently, a colloidal hydrolized coupling agent was remained in a cake-like aluminum fine powder and bonded the aluminum fine powder to form a solid cake after being dried. Therefore, it was difficult to grind the dried cake with a rubber spatula to pass through the 32-mesh sieve net, the time required to grind most of the powder passing through the 32-mesh sieve net was about three times as long as that in the Example 1.

This aluminum fine powder and the aqueous bonding solution prepared in Example 1 were used to prepare a corrosion inhibiting coating composition as in Example 1, and this composition was allowed to pass through a 500-mesh sieve net after being stirred by the homogenizer. A substantial amount of coarse particles of bonded aluminum fine powder were remained on the sieve net. Wood screws were coated with the corrosion inhibiting coating composition prepared in such a manner and subjected to the salt water dipping test as in the case of Example 1. As for the performance of the corrosion inhibiting coating composition, the result of the salt water dipping test shows that the formation of red ferric rust was recognized on the once-coated screws after one week had passed, while the formation of red ferric rust was not recognized on the twice-coated screws even after two months had elapsed.

EXAMPLE 5

Instead of strontium carbonate used in preparation of the aqueous bonding solution in Example 1, 2 g of calcium carbonate (a first class grade reagent) was added. The aqueous bonding solution was prepared under the same conditions as in Example 1. A specific gravity of this aqueous bonding solution was 1.26. Instead of using VA-2000 in Example 1, AC5005 manufactured by TOYO ALUMINUM K.K. as the aluminum fine powder (the fine powder having its mean particle diameter of about 1.08 µm) was used. And the corrosion inhibiting coating composition was prepared in the same manner as Example 1. Wood screws were coated with this composition according to the dip and spin method as in the case of Example 1, then the corrosion inhibiting characteristics was evaluated by the 5% salt-water dipping test. The result shows that the evidence of red rust formation could not be recognized even when two months had elapsed as in Example 1. The remaining corrosion inhibiting coating composition was put into a 250-ml polyethylene bottle and stored in a refrigerator. The corrosion inhibiting coating composition maintained its low viscosity which can afford to coat even after 4 weeks has elapsed.

EXAMPLE 6

2 g of sodium hexametaphosphate was further added to the starting phosphate aqueous solution of Example 1 and dissolved. And the solution was treated as in Example 1 and heated to promote the reaction of generating hydrogen. When it was cooled, an aqueous solution containing precipitate was obtained. The amount of the precipitate was decreased to almost half of the amount in Example 1, and the specific gravity of the obtained filtrate was 1.26. Further, the corrosion inhibiting coating composition was prepared as in Example 1 with the exception of using the fine aluminum powder used in Example 5. Wood screws were coated with this composition by the dip and spin method, and the corrosion inhibiting characteristics were evaluated by the 5% salt water dipping test. The result shows that red ferric rust could not be seen, even after two months had elapsed as in Example 1.

The remaining corrosion inhibiting coating composition was put in a 250-ml polyethylene bottle and stored in a refrigerator. This composition maintained its low viscosity which can afford to coat even when 4 weeks had elapsed.

EXAMPLE 7

Wood screws subjected to the dip and spin coating and baking once and wood screws subjected to the dip and spin coating and baking twice were prepared as in Example 6. Two screws obtained from a once-coated operation and two screws obtained from a twice-coated operation (both of them were not subjected to the burnishing treatment) were placed in a salt water spray test apparatus (salt concentration: 5% by weight, temperature: 35° C.), and the corrosion inhibiting performance of the coating composition was evaluated. As for the screw samples coated once according to the dip and spin method, a slight formation of red rust could be recognized after about 410 hours had elapsed. As for the screw samples coated twice, formation of red rust could not be recognized even after 1776 hours had elapsed.

COMPARATIVE EXAMPLES 1, 2 AND 3

Aluminum fine powder VA-2000 which was not surface-treated with any coupling agent (Comparative Example 1), aluminum fine powder VA-2000 treated with a silane coupling agent (A-162 from Nihon Unicas) as in Example 1 (Comparative Example 2), and aluminum fine powder treated with a silane coupling agent (A-1230 from Nihon Unicas) instead of using the coupling agent used in Comparative Example 2 (Comparative Example 3) were used to prepare corrosion inhibiting coating compositions as in Example 1. In both of Comparative Examples 2 and 3, the aluminum fine powder after treated with the coupling agent exhibited hydrophobic properties, so that the powder could not be suspended in a bonding solution without the aid of a dispersion agent.

The corrosion inhibiting coating composition of Comparative Examples 1, 2 and 3 which were prepared in the morning could be coated to the wood screws in the afternoon of the same day as in Example 1. However, the viscosity of the corrosion inhibiting coating composition stored in the refrigerator was extraordinarily increased on the following day, so that the composition hardly passed through a 325-mesh sieve net because the composition contained solidified particulate substances of aluminum fine powder. Further, the coated films formed according to the dip and spin method as in Example 1 were ununiform in thickness, and the satisfactory dip and spin coating onto the wood screws could not be achieved. Further, each of the corrosion inhibiting coating compositions were solidified in the refrigerator after one week had elapsed.

Each of the wood screw samples coated with the corrosion inhibiting coating composition of Comparative Examples 1 through 3 was evaluated by the salt water dipping test as in the case of Example 1. Each coated sample did not exhibit any formation of red rust after one month. However, after two months had passed, the screw samples coated once with the corrosion inhibiting coating composition from Comparative Examples 2 and 3 exhibited the formation of red rust, while each of the screw samples coated twice with the corrosion inhibiting coating composition did not exhibit any formation of the red rust.

A surface of aluminum fine powder according to the present invention is coated with a thin film of a coupling agent which exhibits hydrophilic property. Therefore, this powder can easily be dispersed in an aqueous phosphate-based bonding solution and the reaction of generating hydrogen can be suppressed when this powder is dispersed in the acidic aqueous phosphate-based bonding solution.

A surface of aluminum fine powder which is surface-treated with a coupling agent according to the present invention is inactivated, so that its preservation and handling are safe compared with the untreated aluminum fine powder.

By using the aluminum fine powder which was treated with the coupling agent according to the present invention, a chromium-free aqueous phosphate-based corrosion inhibiting coating composition, which has been conventionally used within only 1 to 2 days, can be stored in a refrigerator for almost one month, and a corrosion inhibiting coating composition which has been prepared beforehand can be used at the later days.

A chromium-free aqueous phosphate-based coating composition according to the present invention does not have the possibility of producing hexavalent chromium, so that the composition is safe to use and the equipment required for the treatment of the hexavalent chromium becomes unnecessary.

What is claimed is:

1. An aluminum fine powder with overcoat for sacrifice corrosion inhibiting coating, the aluminum fine powder with overcoat comprising:

aluminum fine powder having a surface; and a hydrophilic coupling agent overcoat directly on said surface of said aluminum fine powder.

2. The aluminum fine powder according to claim 1 wherein the overcoat is a titanium-coupling agent overcoat.

3. An aqueous chromium-free coating composition, comprising a slurry mixture in which 25 to 40% by weight of aluminum fine powder is suspended in an acidic phosphate-based aqueous bonding solution, the aluminum fine powder having a hydrophilic coupling agent overcoat directly on a surface of the aluminum fine powder.

4. The aqueous chromium-free coating composition according to claim 3, wherein said is a titanium-coupling agent.

5. The corrosion inhibiting coating composition according to claim 4, wherein said phosphate-based aqueous bonding solution contains phosphate ions, aluminum ions, zinc ions, and two or more kinds of alkaline earth metal ions.

6. An aqueous chromium-free corrosion inhibiting coating composition, comprising a slurry mixture in which 25 to 40% by weight of aluminum fine powder a surface of which is directly treated with a hydrophilic coupling agent is suspended in an acidic phosphate-based aqueous bonding solution, the bonding solution containing phosphate ions, aluminum ions, zinc ions, two or more kinds of alkaline earth metal ions and 0.2 to 1% by weight of polyphosphate ions.

7. The corrosion inhibiting coating composition according to claim 6, wherein the hydrophilic coupling agent is a titanium-coupling agent.

* * * * *